Patented Mar. 18, 1930

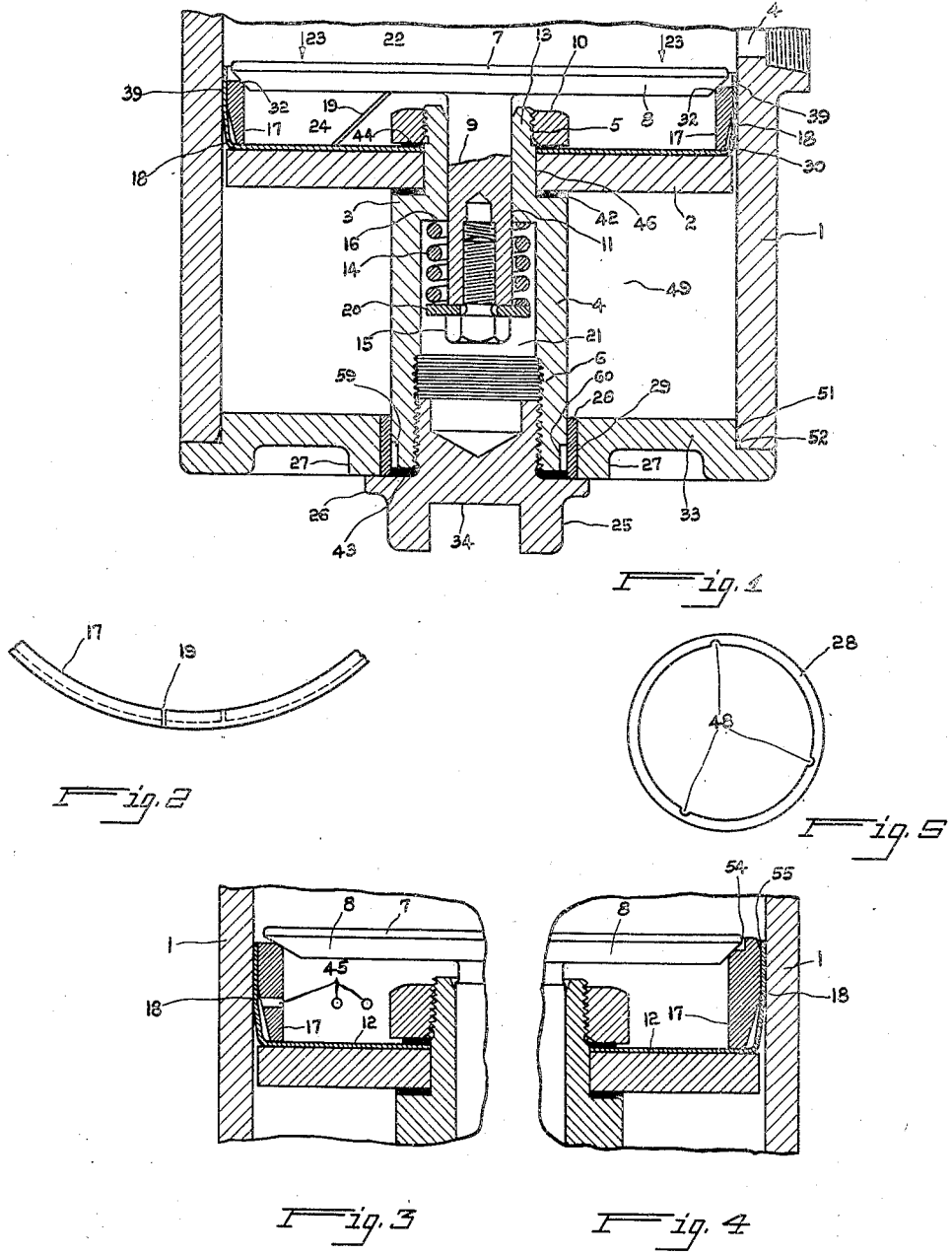

1,750,638

UNITED STATES PATENT OFFICE

WILLIAM McLEAN STEWART JACKSON, OF CLEVELAND, OHIO, ASSIGNOR TO THE GUARDIAN TRUST COMPANY, A CORPORATION OF OHIO

PISTON

Application filed July 17, 1926. Serial No. 123,059.

My invention relates to pistons and relates more particularly to pistons adaptable for use in fluid compression pumps, fluid operated brakes, rams, and the like.

An object of my invention is to provide a piston wherein little or no leakage of gaseous fluid from the cylinder pressure chamber will occur under widely varying conditions of use to which a piston of this kind may in practice be subjected.

Another object of my invention is to provide a piston of the fluid seal type wherein wear between the sealing parts of the piston and the cylinder wall will not be unduly prevalent.

Another object of my invention is to provide a piston of the gaseous fluid seal type which will operate without an undue amount of friction to be had between the piston and the cylinder walls, even under widely differing operating pressure values.

Another object of my invention is to provide a piston which can be readily, inexpensively manufactured and assembled, and when assembled may be placed in a cylinder of proper bore dimensions and will operate efficiently in connection with such cylinder.

Other objects of my invention and the invention itself will become apparent by reference to the following description of an embodiment of my invention, and which is illustrated in the accompanying drawings forming a part of this specification.

Referring to the drawings:

Fig. 1 shows a longitudinal medial sectional view of an embodiment of my invention, certain portions, however, being shown in elevation therein;

Fig. 2 shows a fragment of the expansion ring element forming a part of the piston of Fig. 1, the view being a plan view;

Fig. 3 is a view of a fragment of a piston and cylinder, mostly in longitudinal medial section, the view being of a modification of the embodiment illustrated in Fig. 1;

Fig. 4 is a like view of a further modification; and

Fig. 5 is a plan view of a bearing element.

Referring first to Figs. 1 and 2, at 1, I show the walls of a cylinder in which the piston of my invention is illustrated as having been placed for reciprocation therein, the piston having a disk head 2 and a tubular stem 4, the latter being externally threaded at 5 and internally threaded at 6.

At 7, I show a relatively movable piston head of poppet valve form having a disk head portion beveled at 8 at its intra-peripheral lower edge portion, and comprising also an integral stem 9 depending axially from the disk head 7 and projected within the bore of the tubular piston stem 4, a portion 11 of which forms a guiding bearing for the stem 9. A resilient metallic cup 12 seated on the upper surface of the piston disk head 3 is centrally perforated to admit the reduced end 13 of the stem 4, and is clamped by the nut 10 against the top surface of the disk piston head 2, which in turn is clamped against the shoulder 3 of the piston stem.

A compression spring 14 is compressed between the end wall 16 of the recess 21 in the stem 4, and a washer 20, which is carried by a machine screw 15, is screw threaded into the axial bore of the piston head stem 9. A metallic expansion ring 17 is placed within the side walls 18 of the cup 12. The upper portions of the outer surface of the cup are adapted to contact with the inner walls of the cylinder 1, the ring 17 being preferably of the form illustrated in Figs. 1 and 2, wherein it is shown to be substantially annular and preferably having one or more diagonal slits 19 at some point in its length. The slit, or slits, should preferably be disposed at an angle of 45 degrees or less, relative to a horizontal plane.

When the ring is in place, it communicates a camming effort exerted by the beveled surface 8 of the piston head 7, which is seated upon the preferably rounded inner upper edge of the ring 17, under the influence of the spring 14, and in addition to the spring pressure effect, which constantly tends to expand the cup side walls, this action is increased variably according to the variable amount of pressure exerted by the pressure of gaseous fluid contained in the cylinder chamber 22 and which exerts a pressure in the direction of the arrows 23 upon the entire upper surface of the piston head 7, and which pressure likewise is communicated by the camming action of the beveled surface 8 upon the expansible ring 17 to the cup side walls.

Gaseous fluid pressure will be communicated, restrictedly, through the slit 19 of the ring 17, between the chamber 22 and the space 24 to the rear of the piston head, and I moreover sometimes provide openings 45 through the lateral wall of the ring 17 to increase the rapidity of equalization of pressures contained in the spaces 24 and the space between the ring 17 and the cup side walls 18. The slit 19 also provides a passage for the equalization of pressures in the space 24 and the cylinder chamber 22, whereby gaseous fluid under greater pressure may pass between the walls of the slit 19 to the space of less pressure. These openings are best shown in Fig. 3.

At 42, 43 and 44, I interpose preferably heat resisting fluid sealing gaskets to prevent the escape of fluid under pressure through the joints containing such gaskets. At 46, the cylindrical exterior surface of the reduced end 13 of the piston stem is carefully machined so as to provide a preferably truly cylindrical guiding surface for the like machined bore surface of the disk 2 which closely fits thereupon. The central cup opening has its inner edges closely engaging this cylindrical stem surface and is centered thereby. The top surface of the shoulder 3 of the piston stem 4 is carefully machined to form a planular surface for engagemet with the like planular surface of the engaging piston head disk 2, so that the disk 2 will be carried in a plane precisely at right angles to the stem axis. The piston disk 2, which transmits the thrust exerted upon the head 7 to the piston stem, has a diameter slightly less than the inside diameter of the cylinder walls, so as to be relieved therefrom, preferably no reliance being placed upon the disk 2 for proper alignment of the piston within the cylinder.

The piston, upon a pressure stroke responsive to the effect of fluid pressure exerted against its head 7, will move longitudinally under such pressure, and at the same time the space 24 within the cup and to the rear of the head 7 will have its gaseous fluid pressure increased by the flow of fluid under pressure from the cylinder chamber 22 through the slit 19, until, after an interim, the fluid pressure contained in the space to the rear of the head 7, is of such a pressure that upon release of the pressure in the chamber 22, and the out-flow of fluid from the space 24 being restricted, the excess of pressure in the space 24 over that in the chamber 22 will effect a lifting of the piston head 7 from its seat on the ring 17 to permit the ready and quick release of pressure within the space 24, whereby the side walls 18 of the cup will, by their inherent resiliency, be permitted to contract, lessening the frictional resistance between the cup side walls and the cylinder walls. The piston, therefore, will readily return to the position shown in Fig. 1 under the influence of the retractile pressure exerted at the point 34 by the automotive brake mechanism or other mechanism actuated by the piston.

The pressures 45 in the ring 17 increase the rapidity of equalization of pressures on the interior and exterior walls of the ring and may be omitted in most constructions. This operation permits the easy and smooth retraction of the piston after a compression working stroke, and which smooth, easy return is absent in constructions not having this or equivalent pressure relieving means.

To further assist in securing a good seal and a ready release between the contacting portions of the head 7 and the ring 17, I preferably round the inner upper edge of the ring which contacts with the beveled edge of the head on a radius, and preferably harden the contacting surfaces of the head and the ring so as to increase the longevity of such surfaces and to reduce the frictional resistance exerted between the two surfaces.

The provision of the rounded edge 32 of the ring enables a good seating contact to be had with the beveled edge 8 of the head, even though the head is slighty tilted, and prevents a wedging, binding effect which in other constructions might occur.

The contact element 25, screw threaded at 26 into the bore of the tubular stem 4 of the piston body, communicates the thrust efforts of the piston to actuate a brake mechanism apparatus. The element 25 has an annular laterally extending flange 26, which overlies the end of the stem and a portion 27 of the cylinder end wall to form a stop.

The stem 4 has a pair of oppositely disposed flattened surfaces 59 and 60 relieved from contact with the bearing liner 28, and permits the use of a wrench engaging such surfaces to prevent rotation of the stem 4 when the contact piece 25 is screw threaded into engagement with the threads 6 on the interior of the stem 4.

A bearing liner of relatively non-frictional material is shown at 28 between the piston stem and the tubular surface 29 of the inner wall of a cylindrical opening passing through the end plate 33, and which extends also through the bore of the longitudinally extending boss 27. Referring to Fig. 5, it will be seen that the bearing liner is shown to be relieved in portions 48 of its inner walls to permit the escape of air from the chamber 49 when the piston is actuated, and permits also the inflow of air to the chamber 49 upon a return stroke of the piston. The contact piece 25 is adapted to bear at 34 against the mechanism sought to be moved by the piston, such as an automotive vehicle brake mechanism, or the like, and which mechanism will preferably resist movement of the contact piece 25 longitudinally of the cylinder and will resiliently exert opposing pressure to the movement of the piston. This opposing pressure will be effective to restore the piston to its normal position in the cylinder after the fluid pressure effecting movement of the piston is released.

It is very important that the piston be prevented from cocking, and in the embodiment illustrated, this is substantially prevented by virtue of the concentricity of the fitting surfaces of the end plate 33 and the cylinder wall 1 with the inner wall of the opening through the plate 33 and its boss 27. The concentricity of the bore 29 in the end cover 33 to the bore of the cylinder 1 is preferably accomplished in the following manner:

The end plate 33 is machined with a reduced section 51, which is concentric with the bushing guide hole 29. This reduced section 51 is made to fit accurately in the cylinder bore and therefore keeps the bore of the bushing 28 concentric with the walls of the cylinder 1. The inner edges of the cylinder wall end are preferably beveled, as shown at 52, to permit easy insertion of the assembled piston, including the end wall 33 in the cylinder.

In practice, the side walls of the cup, which are forced into contact with the cylinder side walls in a manner above described, effect an efficient seal against the escape of fluid under pressure from the chamber 22 and causes a relatively large surface to contact with the cylinder side walls, whereby the pressure per unit of contact area is reduced. The cup 18 is relieved from contact with the cylinder walls in its portions 30, which are more nearly adjacent the end wall 12 of the cup.

The distribution of pressure communicated to the side walls of the cup 12, effective to make a seal between the side walls and the cylinder 1, may be varied in different ways, and I show, in Fig. 1, a portion 39 of the cup adjacent its rim extending beyond the upper edge of the ring 17, which will act as a flexible entering edge upon retractive movements of the piston and avoids the effect of maximum pressure exerted between the outer edge of the cup rim and the cylinder side walls.

The reduction of pressure in portions of the cup adjacent its rim may also be effected by the expedients illustrated in Figs. 3 and 4, wherein in Fig. 3 the bevel 8 of the head 7 is flattened, thus reducing the lateral thrust effort of the cam and thus lowering the line of thrust from the beveled edge to the cup, or, as in Fig. 4, by relieving the ring 17 in its upper portions, as at 54 and 55. In the embodiment of Fig. 4, the effect is much the same as in the embodiment of Fig. 1, and the rim of the cup in both cases is free of the expanding ring. In all of the described embodiments, the cup rim pressure is decreased from that pressure exerted upon the cylinder side walls by portions of the cup side walls more remote from the rim.

The cup 18 if of metallic material, and although it may vary in composition, it should be of such a material as to have inherent resiliency and good bearing qualities in its surface portions adapted to contact with the cylinder walls, and I have found that a special heat treated alloy of aluminum bronze of approximately a composition of 86 per cent copper, 8 per cent zinc, 4 per cent aluminum and 2 per cent iron, is effective to secure very satisfactory results under conditions of use commonly encountered. The ring 17 may be made of cast iron or steel, or of a more plastic material so long as a hardened bearing seat 32 is secured. Where the material of the ring is too soft to secure a hardened bearing seat of such material, I contemplate, by fusion or otherwise, securing a bearing seat portion 32 to the body of the ring. However, I find that a homogeneous ring made from mild steel tubing, so heat treated as to relieve the inherent strains, operates in a very satisfactory manner for most purposes.

Where the parts above described are subjected to rusting conditions, such as in air brake practice, I preferably electrolytically deposit a thin coating of cadmium upon such surfaces, excepting that bearing surfaces will not be so coated.

The spring 14 may advantageously vary in strength according to the conditions of use to which the piston is subjected in practice, but I preferably make the spring 14 insufficiently strong to hold the head 7 on the seat 32 to prevent ready equalization of pressures in the space 24 and the cylinder chamber 22 when the gaseous fluid in the chamber 22 is exhausted, and which has been described as being effected by the lifting of the head by the trapped compressed fluid. At the same time, the spring 14 is preferably strong enough that the head will be resiliently pressed onto the seat 32 with sufficient pressure to expand the side walls 18 of the cup against the cylinder walls at all other times, but without undue friction.

Having thus described my invention in a specific embodiment, I am aware that numerous and extensive departures may be made from the embodiments herein illustrated and described but without departing from the spirit of my invention.

I claim:

1. In a piston, the combination with a metallic cup having resilient thin side walls, of a split metallic ring telescoped within the cup, a piston body carrying said cup, the cup side walls being projected forwardly therefrom, of a piston head normally spring pressed toward the piston body and making at an edge portion engagement with an inner upper portion of the ring, said head movable under the combined effects of spring pressure and pressure of fluid exerted against its outer surface to cam the ring outwardly to effect expansion of portions of cup side walls adjacent its rim into sealing engagement with enclosing cylinder walls.

2. In a piston, the combination with a metallic cup having a relatively thin side wall, of a split metallic ring telescoped within the cup, a piston body carrying said cup with its side walls projecting forwardly therefrom, of a piston head normally spring pressed toward the piston body and making at an edge portion a camming engagement with an inner upper edge of the said ring to expand the ring against the inner side walls of the cup, said head adapted to present a pressure face to the pressure of fluid which may be contained under pressure in a cylinder in which the piston may be placed, said head movable under the combined effects of spring and fluid pressures to cam the ring outwardly to expand portions of the cup side walls adjacent its rim into effective sealing engagement with the walls of such cylinder.

3. In a piston, the combination with a resilient cup, of a split metallic ring telescoped within the cup, a piston body carrying said cup with its side walls projecting forwardly therefrom, of a piston head normally spring pressed toward the piston body and making at an edge portion a camming engagement with an inner upper portion of the said ring to expand the ring against the inner side walls of the cup, said head adapted to present a pressure face to the pressure of fluid which may be contained under pressure in a cylinder in which the piston may be placed, a spring, said head movable under the effect of pressure exerted by the spring to cam the ring outwardly to expand the portions of the cup side walls adjacent its rim into effective sealing engagement with the walls of such cylinder, said ring having a wall thickness adjacent the line of contact between the head and the ring at least three times the thickness of the adjacent cup side wall portion.

4. In a piston, the combination with a metallic cup having a relatively thin side wall of a split metallic ring having a cylindrical outer face telescoped within the cup, a piston body carrying said cup with its side walls projecting forwardly therefrom, of a piston head normally spring pressed toward the piston body and making at an edge portion a camming engagement with an inner upper portion of the said ring to expand the ring against the inner side walls of the cup, said head adapted to present a pressure face to the pressure of fluid which may be contained under pressure in a cylinder in which the piston may be placed, said head movable under the effect of such fluid pressure to cam the ring outwardly to expand the portions of the cup side walls adjacent its rim into effective sealing engagement with the walls of such cylinder, said ring contacting with the side walls of the cup along the upper inner surface of such side walls and being relieved therefrom adjacent more lowerly disposed side wall surface portions.

5. In a piston, the combination with a metallic cup having a relatively thin side wall, of an expansible metallic ring telescoped within the cup, a piston body carrying said cup with its side walls projecting forwardly therefrom, of a piston head normally spring pressed toward the piston body and making at an edge portion, a camming engagement with an inner upper portion of the said ring to expand the ring against the inner side walls of the cup, said head adapted to present a pressure face to the pressure of fluid which may be contained under pressure in a cylinder in which the piston may be placed, said head movable under the combined effects of spring and fluid pressures to cam the ring outwardly to expand the portions of the cup side walls adjacent its rim into pressure sealing engagement with the walls of such cylinder, said ring having a wall thickness adjacent the line of contact between the head and the ring at least three times the thickness of the adjacent cup side wall portion, and being of reduced wall thickness and disposed out of engagement with the cup side wall portions adjacent the cup end wall.

6. In a piston, the combination with a metallic cup having a relatively thin side wall, of an expansible resilient metallic ring telescoped within the cup, a piston body carrying said cup with its side walls projecting forwardly therefrom, of a piston head normally spring pressed toward the piston body and making at an edge portion a camming engagement with an inner upper portion of the said ring to expand the ring against the inner side walls of the cup, said head adapted to present a pressure face to the pressure of fluid which may be contained under pressure in a cylinder in which the piston may be placed, of said head movable under the combined effects of spring and fluid pressures to cam the ring outwardly to expand the portions of the cup side walls adjacent its rim into pressed sealing engagement with the walls of such cylinder, said cup being of a relatively more resilient material than the material of said ring.

7. In a piston, the combination with a metallic cup having resilient thin side walls, of an expansible metallic ring telescoped within the cup, a piston body carrying said cup, the cup side walls being projected forwardly therefrom, of a piston head normally spring pressed toward the piston body and making, at an annular portion, engagement with an inner upper portion of the ring, said head movable under the combined effects of spring pressure and pressure of fluid exerted against its outer surface to cam the ring outwardly to effect expansion of portions of the cup side walls remote from its end wall into sealing engagement with enclosing cylinder walls.

8. In a piston, the combination with a metallic cup having resilient thin side walls, of an expansible metallic ring telescoped within the cup, a piston body carrying said cup, the cup side walls being projected forwardly therefrom, of a piston head normally spring pressed toward the piston body and making, at an annular portion, engagement with an inner upper portion of the ring, said head movable under the combined effects of spring pressure and pressure of fluid exerted against its outer surface to cam the ring outwardly to effect expansion of portions of the cup side walls into sealing engagement with enclosing cylinder walls, the cup being relieved from the cylinder side walls in portions adjacent its end wall, the ring being likewise relieved from such cup side wall portions.

9. In a piston, the combination with a metallic cup having resilient thin side walls, of an expansible metallic ring telescoped within the cup, a piston body carrying said cup, the cup side walls being projected forwardly therefrom, of a piston head normally spring pressed toward the piston body and making, at an annular portion, engagement with an inner upper portion of the ring, said head movable under the combined effects of spring pressure and pressure of fluid exerted against its outer surface to cam the ring outwardly to effect expansion of portions of the cup side walls into sealing engagement with enclosing cylinder walls, the ring making engagement with the piston along an inner upper edge, which is convexly rounded transversely.

10. In a piston, the combination with a piston stem having an axial bore, one end of the stem being reduced and exteriorly threaded, a head disk having a central cylindrical aperture fitted over the reduced end of the stem and seated on the shoulder adjoining such reduced end, a metallic cup having resilient side walls seated on the disk with its side walls extending therefrom, said cup having its end walls centrally apertured and passed over the reduced end of the stem, a clamping nut screw threaded onto the exteriorly threaded portion of the stem to clamp the cup and head disk against said shoulder, a movable piston head of poppet valve form having an axial stem projected within the bore of the stem reduced portion and guided by the inner walls thereof, an expansible split ring 17 disposed within the side walls of the cup and expandible by the effect of the movement of the head toward the said head disk, a spring disposed within the stem bore engaging the movable head and exerting a constant pressure tending to move the head toward said head disk, said head being responsive to fluid pressure on its outer surface to cause an increase in pressure tending to expand the ring.

11. In an air brake operating cylinder, the combination with a cylinder and a piston reciprocable therein, the piston comprising a metallic cup having flexible side walls, a disk, said cup mounted upon said disk and a stem with a reduced cylindrical upper portion on which said disk and said cup are concentrically mounted, means cooperating with the end of the reduced portion within the cup to effect a clamping of the inner portions of the cup and disk on the stem, a diagonally split metal ring telescoped within the cup, said ring having an inner upper rounded edge and an outer wall reduced in its portion adjacent the cup end wall, a piston head having an axial stem projected through the piston stem and guided thereby and a flanged head engageable at a beveled portion with the rounded edge of the ring, spring means for resiliently effecting a constant pressure on the piston head to expand the ring against the inner walls of the cup, said spring pressure being of sufficient magnitude as to effect expansion of the cup side walls against the cylinder walls into effective sealing engagement with the cylinder walls.

12. In an air brake operating cylinder, the combination with a cylinder and a piston reciprocable therein, the piston comprising a metallic cup having flexible side walls, a disk, said cup mounted upon said disk and a stem with a reduced cylindrical upper portion on which said disk and said cup is concentrically mounted, means cooperating with the end of the reduced portion within the cup to effect a clamping of the inner portions of the cup and disk on the stem, a diagonally split metal ring telescoped within the cup ring having an inner upper rounded edge and an outer wall reduced in its portion adjacent the cup end wall, a piston head having an axial stem projected through the piston stem and guided thereby, and a flanged head engageable at a beveled portion with the rounded edge of the ring, spring means for resiliently effecting a constant pressure on the piston head to expand the ring against the inner walls of the cup, said spring pressure being of sufficient magnitude as to effect expansion of the cup side walls against the cylinder walls into effective sealing engagement with the cylinder walls, and fluid sealing means for the stem to prevent loss of pressure past the contacting surfaces of the piston head stem and the guiding surfaces of the piston stem.

In testimony whereof I hereunto affix my signature this 15th day of July, 1926.

WILLIAM McLEAN STEWART JACKSON.